(12) United States Patent
Sugimura et al.

(10) Patent No.: US 10,253,823 B2
(45) Date of Patent: Apr. 9, 2019

(54) COOLING STRUCTURE IN CLUTCH

(71) Applicant: JATCO Ltd, Fuji-shi, Shizuoka (JP)

(72) Inventors: Akira Sugimura, Sagamihara (JP); Atsushi Maeda, Fujinomiya (JP); Kou Takahashi, Odawara (JP); Jumpei Hayakawa, Isehara (JP); Tadashi Naito, Toyohashi (JP); Takashi Kubo, Hadano (JP)

(73) Assignee: JATCO Ltd, Fuji-shi (JP)

( * ) Notice: Subject to any disclaimer, the term of this patent is extended or adjusted under 35 U.S.C. 154(b) by 62 days.

(21) Appl. No.: 15/311,959

(22) PCT Filed: Feb. 26, 2015

(86) PCT No.: PCT/JP2015/055521
§ 371 (c)(1),
(2) Date: Nov. 17, 2016

(87) PCT Pub. No.: WO2015/178058
PCT Pub. Date: Nov. 26, 2015

(65) Prior Publication Data
US 2017/0122383 A1 May 4, 2017

(30) Foreign Application Priority Data
May 22, 2014 (JP) .................. 2014-106074

(51) Int. Cl.
*F16D 13/72* (2006.01)
*F16D 13/74* (2006.01)
(Continued)

(52) U.S. Cl.
CPC ............. *F16D 13/72* (2013.01); *F16D 13/52* (2013.01); *F16D 13/648* (2013.01);
(Continued)

(58) Field of Classification Search
CPC ...... F16D 13/52; F16D 13/648; F16D 13/683; F16D 13/72; F16D 13/74
See application file for complete search history.

(56) References Cited

U.S. PATENT DOCUMENTS 5,682,971 A 11/1997 Takakura et al.
6,135,256 A 10/2000 Han et al.
(Continued)

FOREIGN PATENT DOCUMENTS

EP 2 028 382 A2 2/2009
JP 06-050353 A 2/1994
(Continued)

*Primary Examiner* — David R Morris
(74) *Attorney, Agent, or Firm* — Foley & Lardner LLP

(57) ABSTRACT

In a cooling structure in a clutch having drive plates and driven plates, a lower limit of a width of each of dot grooves is set to a width a at which a flow quantity of lubricating oil passing through each of the dot grooves becomes a minimum flow quantity at which the drive plates and the driven plates can be cooled to a temperature equal to or lower than an upper limit temperature (Tmax) and an upper limit of the width of each of the dot grooves is set to a width b at which an air content in lubricating oil passing through each of the dot grooves becomes a maximum air content at which, according to lubricating oil having the air content, the drive plates and the driven plates can be cooled to a temperature equal to or lower than the upper limit temperature (Tmax).

11 Claims, 5 Drawing Sheets

(51) Int. Cl.
*F16D 13/52* (2006.01)
*F16D 13/68* (2006.01)
*F16D 13/64* (2006.01)
*F16D 25/0638* (2006.01)
*F16D 55/40* (2006.01)
*F16D 65/853* (2006.01)
*F16D 69/00* (2006.01)

(52) U.S. Cl.
CPC ........... *F16D 13/683* (2013.01); *F16D 13/74* (2013.01); *F16D 25/0638* (2013.01); *F16D 55/40* (2013.01); *F16D 65/853* (2013.01); *F16D 2069/004* (2013.01); *F16D 2300/0214* (2013.01)

(56) References Cited

U.S. PATENT DOCUMENTS

| | | | |
|---|---|---|---|
| 2001/0042668 A1 | 11/2001 | Ono et al. | |
| 2012/0175216 A1 | 7/2012 | Hiramatsu et al. | |
| 2015/0260237 A1* | 9/2015 | Saito | F16D 25/10 192/48.619 |

FOREIGN PATENT DOCUMENTS

| | | |
|---|---|---|
| JP | 2001-295859 A | 10/2001 |
| WO | WO-2011/033861 A1 | 3/2011 |

* cited by examiner (a)

(b)

(a)

(b)

(a)

(b)

COOLING STRUCTURE IN CLUTCH

TECHNICAL FIELD

The present invention relates to a cooling structure in a clutch.

BACKGROUND ART

In an automatic transmission for a vehicle, a frictional engagement element (a clutch) having a plurality of friction plates is disposed on a transmission path of a rotation driving force inputted from an engine.

In this frictional engagement element, inner diameter side friction plates and outer diameter side friction plates, both of the inner diameter side and the outer diameter side friction plates being relatively rotatably disposed on the same axis, are alternately arranged in a direction of a rotation axis. When the inner diameter side friction plates and the outer diameter side friction plates are pressed by a piston in the direction of rotation axis, facing members disposed on each of the inner diameter side friction plates are brought into contact with a corresponding one of the outer diameter side friction plates under pressure. Thus, the inner diameter side friction plates and the outer diameter side friction plates are engaged in a state of being incapable of relative rotation.

In the frictional engagement element, when the relative rotation between each of the inner diameter side friction plates and the corresponding one of the outer diameter side friction plates is regulated, a transmission of the rotation driving force between an upstream side of the frictional engagement element and a downstream side of the frictional engagement element becomes possible. When the relative rotation becomes possible, the transmission of the rotation driving force cannot be carried out.

Therefore, in the automatic transmission for the vehicle, transmission/non-transmission of the rotation driving force in a plurality of the frictional engagement elements equipped in the automatic transmission is modified in accordance with a traveling state of the vehicle so that a transmission path of the rotation driving force is switched to achieve a desired traveling performance and a desired gearshift stage.

It should, herein, be noted that, when the transmission/non-transmission of the rotation driving force in each of the frictional engagement elements is switched, a state of the friction plates in a corresponding one of the frictional engagement elements is switched between an engagement state and a release state so that the inner diameter side friction plates and the outer diameter side friction plates become temporarily in a slipped state and generate heat.

Therefore, in the automatic transmission for the vehicle, lubricating oil supplied from an inner diameter side of the automatic transmission is guided to the clutch according to a centrifugal force and the inner diameter side friction plates and the outer diameter side friction plates are cooled with the guided lubricating oil. For example, a Patent Document 1 discloses that oil grooves are disposed on the respective facing members installed on each of the inner diameter side friction plates to improve a coolability of the clutch.

PRE-PUBLISHED DOCUMENT

Patent Document

Patent Document 1: a Japanese Patent Application First Publication (tokkai) 2001-295859.

FIG. 6 is an explanatory view for one example of a conventional friction plate.

As shown in FIG. 6, on an inner diameter side friction plate 100, facing members 105 are disposed at an opposing surface thereof against an outer diameter side friction plate (not shown). Facing members 105 are disposed with spatial intervals provided in a peripheral direction around rotation axis X of friction plate 100.

Each part between peripheral directionally adjacent facing members 105 provides a dot groove 101 through which lubricating oil OL supplied from an inner diameter side is caused to flow toward an outer diameter side. When lubricating oil OL is caused to flow through this dot groove 101, lubricating oil OL removes heat from friction plate 100 so that friction plate 100 is cooled.

In addition, grid shaped waffle grooves 106 are disposed on each of facing members 105. When lubricating oil OL is caused to flow through each of waffle grooves 106, lubricating oil OL removes heat from each of facing members 105 so that facing members 105 and friction plate 100 are cooled.

DISCLOSURE OF THE INVENTION

Problem to be Solved by the Invention

In the automatic transmission, a shaft member 102 which is rotated around rotation axis X is positioned at the inner diameter side of friction plate 100. This shaft member 102 is provided with oil holes 102a through each of which lubricating oil is passed. Lubricating oil discharged from oil holes 102a toward an outer side of a radial direction is reached to friction plate 100 positioned at the outer diameter side of shaft member 102 by a centrifugal force generated according to a rotation of shaft member 102 so that friction plate 100 is cooled (lubricated).

Conventionally, it is a general thought that, if far more (a larger) quantity of lubricating oil is supplied to the friction plates, a cooling effect of the friction plate is increased. In order to improve the cooling effect of the friction plate, a flow passage cross sectional area until lubricating oil supplied from oil holes 102a reaches to the friction plate is enlarged so that the far more (larger) quantity of lubricating oil is supplied to the friction plate.

However, an inner space of the automatic transmission is limited. There is a limit in improvement of the cooling effect of the friction plate (clutch) only by enlarging the flow passage cross sectional area for lubricating oil. The further improvement of the coolability of the friction plate is demanded.

Means to be Solved by the Invention

According to the present invention, there is provided a cooling structure in a clutch in which an inner diameter side friction plate having an inner diameter side spline-fitted and an outer diameter side friction plate are relatively rotatably disposed around a common rotation axis and, when the inner diameter side friction plate and the outer diameter side friction plate are pressed in the rotation axis direction by means of a piston, facing members disposed on one of the inner diameter side friction plate and the outer diameter side friction plate are brought in contact with the other of the inner diameter side friction plate and the outer diameter side friction plate under pressure and a relative rotation between the inner diameter side friction plate and the outer diameter side friction plate is regulated in accordance with a pressing force, wherein the facing members on the one of the inner diameter side friction plate and the outer diameter side friction plate are disposed with a predetermined interval left in the peripheral direction around the rotation axis and a groove through which lubricating oil which is moved from the inner diameter side to the outer diameter side according to a centrifugal force is formed between mutually adjoined facing members in the peripheral direction, wherein a lower limit of a width of the groove viewed from the rotation axis direction is set on a basis of a flow quantity of lubricating oil passing through the groove and an upper limit of the width is set on a basis of an air content in lubricating oil passing through the groove, wherein the lower limit is set to a first threshold width at which the flow quantity of lubricating oil passing through the groove becomes a minimum flow quantity at which a cooling of the inner diameter side friction plate and the outer diameter side friction plate to a temperature equal to or lower than a predetermined temperature is possible, and wherein the upper limit is set to a second threshold width at which the air content in lubricating oil passing through the groove becomes a maximum content at which, according to lubricating oil having the air content, the cooling of the inner diameter side friction plate and the outer diameter side friction plate to a temperature equal to or lower than the predetermined temperature is possible.

Effect of the Invention

In the groove through which lubricating oil moved toward the outer diameter side according to the centrifugal force is caused to flow, as the width of the groove becomes narrower, the flow quantity of lubricating oil becomes smaller and the air content in lubricating oil passing through the groove becomes lower and, on the other hand, as the width of the groove becomes wider, the flow quantity of lubricating oil becomes larger and the air content in lubricating oil passing through the groove becomes higher.

Therefore, the coolability of the friction plates is dependent upon the flow quantity of lubricating oil in a case where the width of the groove is narrow and the coolabiliity of the friction plates is dependent upon the air content in lubricating oil passing through the groove in a case where the width of the groove is wide.

Thus, according to the cooling structure described above, the lower limit which regulates the narrower width of the groove is set on a basis of the flow quantity of lubricating oil and the upper limit which regulates the wider width of the groove is set on a basis of the air content in lubricating oil passing through the groove. At this time, the upper limit and the lower limit of width of the groove are set on a basis of a factor having a larger influence on a coolability of the friction plates. Consequently, since the upper limit and the lower limit of width of the groove which can suitably cool the friction plates can be set, the coolability of the friction plates and the clutch having the friction plates can furthermore be improved.

BRIEF DESCRIPTION OF THE DRAWINGS (a) and (b) of FIG. 1 are explanatory views for explaining a cooling structure in a clutch in a preferred embodiment.

(a) and (b) of FIG. 2 are explanatory views for explaining a distribution of lubricating oil at an inner diameter side of a friction plate and facing members installed on the friction plate.

(a) and (b) FIG. 3 are graphs for explaining a relationship among a width of a dot groove, a flow quantity of lubricating oil, and an air content in lubricating oil.

EMBODIMENT FOR CARRYING OUT THE INVENTION

A preferred embodiment according to the present invention will, hereinbelow, be described with reference to the attached drawings.

Figure 1:
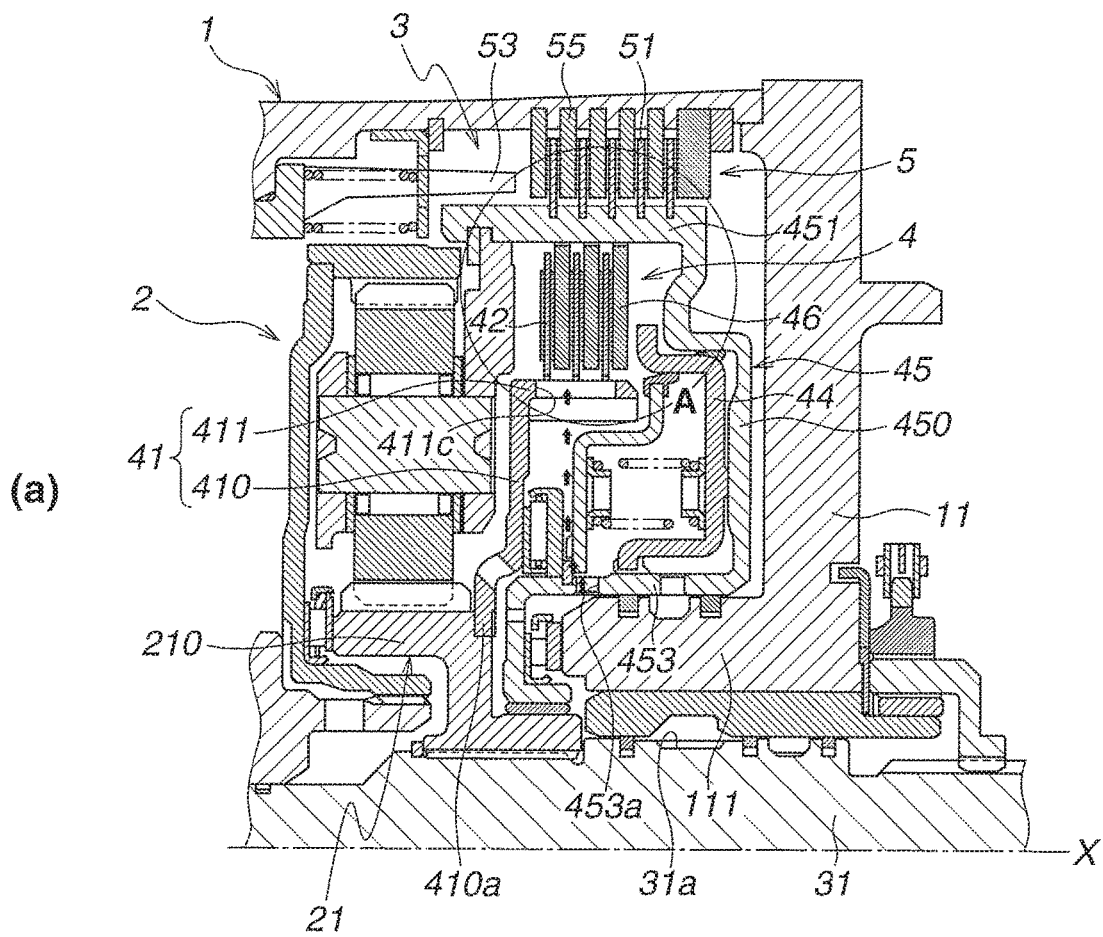
Figure 1:
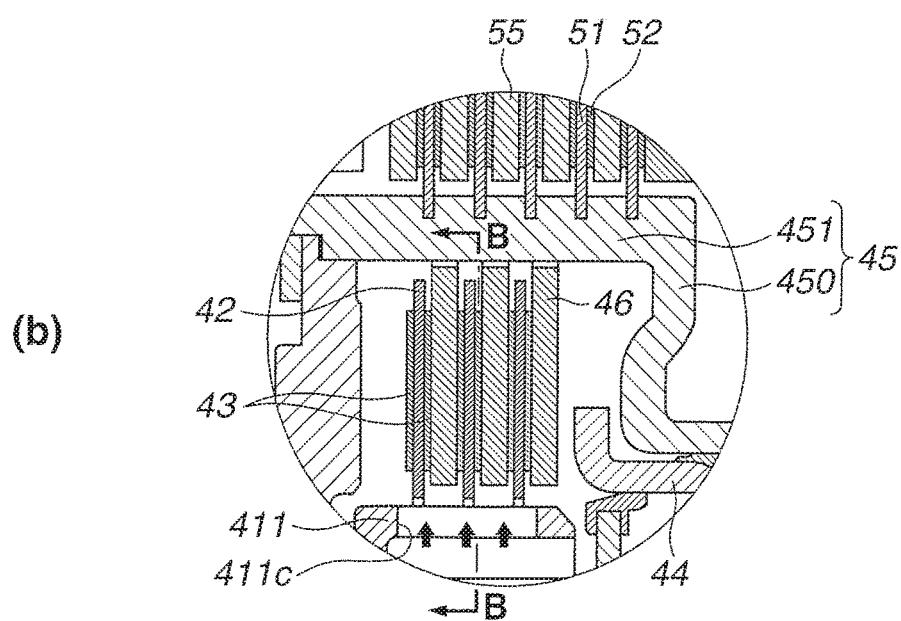

(a) and (b) of FIG. 1 are explanatory views for explaining a cooling structure in a clutch in the preferred embodiment, (a) of FIG. 1 being an expanded cross sectional view of a forward-or-backward travel switching mechanism 3 of a continuously variable transmission and (b) of FIG. 1 being an expanded view of a region A in (a) of FIG. 1.

A forward clutch 4 and a reverse brake 5 are positioned between a front cover section 11 and a double pinion planetary gear train 2, at an inside of a transmission casing 1.

Reverse brake 5 is positioned at an outer diameter side of forward clutch 4. Reverse brake 5 includes: drive plates 51, each being spline-fitted to an outer periphery of a clutch drum 45; driven plates 55, each being spline-fitted to an inner periphery of transmission casing 1; and a piston 53 which strokes in an axial direction of a rotation axis X in response to a hydraulic pressure.

Drive plates 51 and driven plates 55 are alternately arranged along the axial direction of rotation axis X. When these drive plates 51 and driven plates 55 are pressed toward the axial direction of rotation axis X by means of piston 53, facing members 52 disposed on respective drive plates 51 (refer to (b) of FIG. 1) are brought in contact with respective driven plates 55 under pressure so that respective driven plates 55 and respectively corresponding drive plates 51 are engaged with one another in a state of being incapable of relative rotation.

It should, herein, be noted that driven plates 55 are spline-fitted to the inner periphery of transmission casing 1 and, thus, a rotation of each of the driven plates around rotation axis X is regulated. Therefore, when drive plates 51 and driven plates 55 are engaged with one another in the state of being incapable of relative rotation, a rotation around rotation axis X of clutch drum 45 to which drive plates 51 are spline-fitted is regulated.

Clutch drum 45 includes: a peripheral wall section 451 to the outer periphery of which drive plates 51 are spline-fitted; and a bottom wall section 450 extended toward the inner diameter side from one end of peripheral wall section 451. Clutch drum 45 is formed in a bottomed cylindrical shape. Driven plates 46 of forward clutch 4 are spline-fitted to the inner periphery of peripheral wall section 451.

Forward clutch 4 includes: driven plates 46; drive plates 42 spline-fitted to the outer periphery of clutch hub 41; and a piston 44 which strokes along the axial direction of rotation axis X in response to the hydraulic pressure.

Clutch hub 41 includes: a peripheral wall section 411 having an outer periphery to which drive plates 42 are spline-fitted; and a bottom section 410 extended from one end of peripheral wall section 411 toward the inner diameter side. Clutch hub 41 is formed in a bottomed cylindrical shape.

Mutual openings of clutch hub 41 and clutch drum 45 are opposed against each other within transmission casing 1 and clutch hub 41 and clutch drum 45 are assembled from the axial direction of rotation axis X. Clutch hub 41, in this state, is housed within an inside of peripheral wall section 451 of clutch drum 45.

Figure 2:
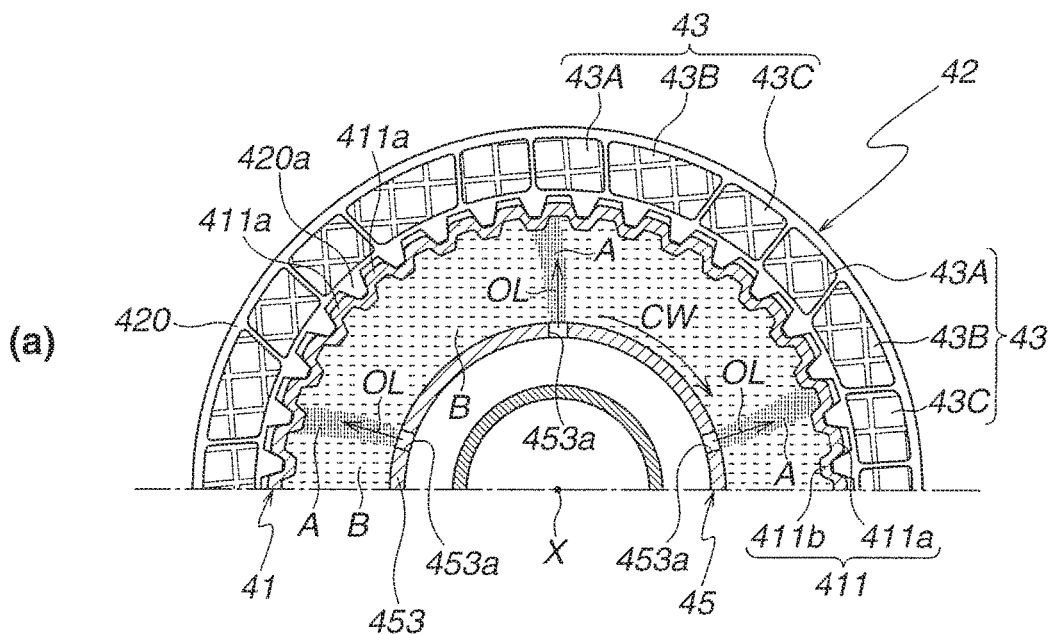
Figure 2:
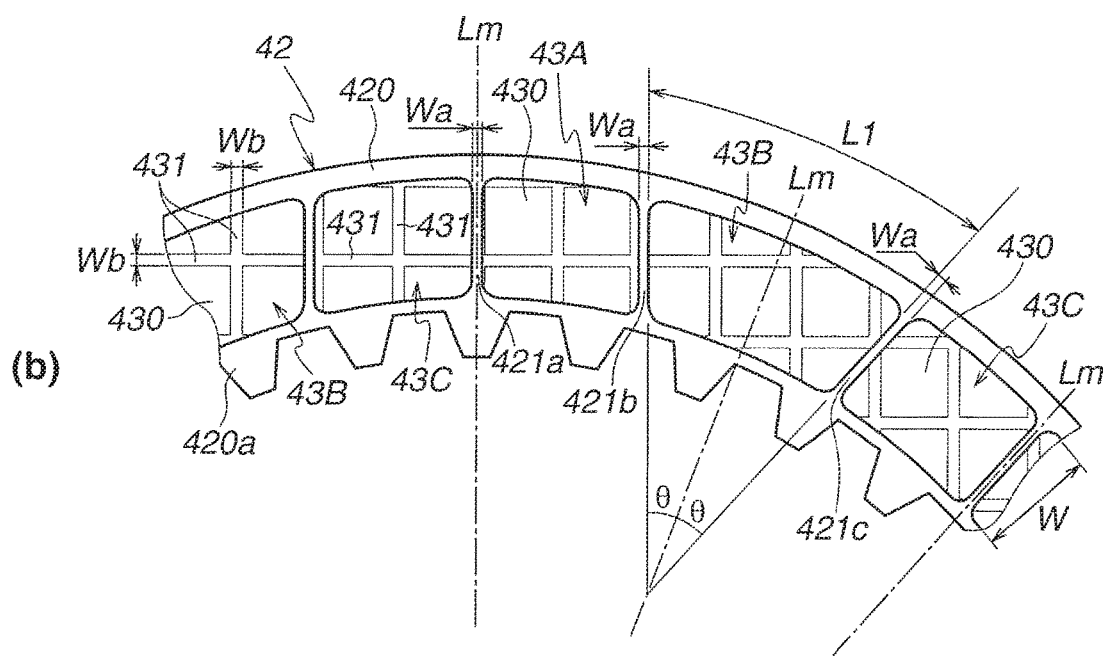

As shown in (a) of FIG. 2, as viewed from the axial direction of rotation axis X, peripheral wall section 411 of clutch hub 41 is formed in such a way that spline crest sections 411a positioned at the outer diameter side and spline valley sections 411b positioned at the inner diameter side are alternately continued along the peripheral direction around rotation axis X. Each of drive plates 42 of forward clutch 4 is spline-fitted to outer peripheries of respective spline valley sections 411a. In this state, each of drive plates 42 has projection sections 420a, each of the projection sections being projected toward the inner diameter side. Each of projection sections 420a is positioned between spline crest sections 411a, 411a which are mutually adjoined in the peripheral direction around rotation axis X. Each of drive plates 42 is disposed to enable a displacement in the axial direction of rotation axis X in a state in which a relative rotation of each of the drive plates to clutch hub 41 in the peripheral direction around rotation axis X is regulated.

As shown in (a) and (b) of FIG. 1, in forward clutch 4, drive plates 42 and driven plates 46 are alternately arranged in the axial direction of rotation axis X. When these drive plates 42 and driven plates 46 are pressed in the axial direction of rotation axis X by means of piston 44, facing members 43 disposed on respective drive plates 42 (refer to (b) of FIG. 1) are brought in contact with driven plates 46 under pressure so that drive plates 42 and driven plates 46 are engaged with one another in the state of being incapable of relative rotation.

It should, herein, be noted that a bottom section 410 of clutch hub 41 includes a peripheral edge section 410a positioned at the inner diameter side and which is welded to a cylindrical base section 210 of a sun gear 21 and sun gear 21 and clutch hub 41 are mutually linked to each other in a state in which relative rotation in the peripheral direction around rotation axis X is regulated. Then, sun gear 21 is attached and spline-fitted to the outer periphery of an input shaft 31 of forward-or-backward travel switching mechanism 3. Hence, when input shaft 31 is rotated by the rotation driving force inputted from a driving source not shown, sun gear 21 and drive plates 42, the drive plates being spline-fitted to clutch hub 41, are integrally rotated (in a unit) around rotation axis X.

Therefore, in this state, when drive plates 42 and driven plates 46 are engaged with one another in the state of being incapable of relative rotation by means of piston 44, the rotation driving force inputted to input shaft 31 is transmitted to clutch drum 45 via mutually engaged drive plates 42 and driven plates 46.

A cylindrical inner wall section 453 extrapolated to a cylindrical support section 111 of front cover section 11 is disposed at the inner diameter side of clutch drum 45. Oil holes 453a, each being penetrated through inner wall section 453 in the radial direction, are disposed at this inner wall section 453.

In this embodiment, another oil hole 31a is formed on an outer periphery of input shaft 31 which is rotated around rotation axis X. Lubricating oil is supplied to an inside of transmission casing 1 via this oil hole 31a.

Then, lubricating oil supplied from this oil hole 31a to the inside of transmission casing 1 is moved toward the outside in the radial direction according to a centrifugal force due to the rotation. Part of lubricating oil supplied from oil hole 31a reaches up to peripheral wall section 411 of clutch hub 41 positioned at the outside in the radial direction of inner wall section 453 via oil holes 453a disposed on inner wall section 453 of clutch drum 45 (refer to arrowed marks in (a) of FIG. 1).

Then, lubricating oil which has reached to peripheral wall section 411 of clutch hub 41 is supplied to drive plates 42 and driven plates 46 positioned at the outer side of the radial direction of peripheral wall section 411 via an oil channel 411c disposed on peripheral wall section 411 so that drive plates 42 and driven plates 46 are lubricated (cooled).

As shown in (a) of FIG. 2, each of drive plates 42 includes a plate-like base section 420 in a ring shape as viewed from the axial direction of rotation axis X.

Facing members 43, each having a predetermined width W (refer to (b) of FIG. 2) in the radial direction of rotation axis X, are adhered onto a region of this base section 420 opposing against a corresponding one of driven plates 46. In this embodiment, facing members 43 are provided on both surfaces of plate-like base section 420 (refer to (b) of FIG. 1).

Facing members 43 are plurally disposed with spatial intervals provided in the peripheral direction around rotation axis X.

In this embodiment, a structure in which a trapezoid shaped facing member 43B in plan view is interposed between substantially parallelogram shaped facing members 43A, 43C in plan view is assumed as a basic unit. In base section 420, facing members 43 (43A, 43B, 43C) of this basic unit are plurally continued in the peripheral direction around rotation axis X.

It should be noted that in the following explanation, in a case where facing members 43A, 43B, and 43C are not specially distinguished, they are simply written as facing members 43.

Dot grooves 421 (421a, 421b, 421c) through which lubricating oil OL is caused to flow are formed between facing members 43, 43 mutually adjoined in the peripheral direction. In this embodiment, each of drive plates 42 is cooled according to lubricating oil OL caused to flow through respective dot grooves 421.

As shown in (b) of FIG. 2, a respective one of dot grooves 421a located between facing member 43A and facing member 43C is formed with an equal width Wa along a diameter line Lm of base section 420 formed in a ring shape viewed from the axial direction of rotation axis X.

The respective one of dot grooves 421b between facing member 43A and facing member 43B and the respective one of dot grooves 421c between facing member 43B and facing member 43C are symmetrically disposed with diameter line Lm of base section 420 as a center. These dot grooves 421b, 421c are also formed, each having an equal width Wa over a whole length of an elongated direction.

In this embodiment, each of dot grooves 421b, 421c is slanted through a predetermined angle θ with respect to diameter line Lm and an interval L1 of dot grooves 421b, 421c in the peripheral direction around rotation axis X becomes wider as interval L1 is directed from the inner diameter side of base section 420 to the outer diameter side thereof. It should be noted that, in a case where dot grooves 421a, 421b, 421c are not specially distinguished, these are simply written as dot grooves 421.

Waffle grooves 431 formed in a grid shape in plan view are disposed on a front surface of each of facing members 43.

Part of lubricating oil OL flowing through dot grooves 421 is caused to flow through waffle grooves 431 and lubricating oil OL flowing through waffle grooves 431 removes heat from respective facing members 43. Thus, facing members 43 and the region of base section 420 onto which facing members 43 are adhered are cooled.

In this embodiment, after facing members 43 having no waffle grooves 431 are adhered onto base section 420 of each of drive plates 42, facing members 43 are pressed with a punch (not shown) having grid shaped projections under pressure to form waffle grooves 431. Therefore, since waffle grooves 431 in each of facing members 43 are formed as recessed grooves in concave shapes from a pressure-contact surface 430 against a corresponding one of driven plates 46, respective waffle grooves 431 are formed with mutually equal widths Wb.

It should, herein, be noted that movement and distribution of lubricating oil OL within transmission casing 1 will be explained.

In this embodiment, lubricating oil OL caused to flow through dot grooves 421 and waffle grooves 431 is supplied within transmission casing 1 from oil hole 31a of input shaft 31 rotated around rotation axis X. It should be noted that, since the centrifugal force according to the rotation is acted upon lubricating oil OL supplied from oil hole 31a, lubricating oil OL is moved within the inside of transmission casing 1 toward the outer diameter side.

Then, lubricating oil OL supplied from oil hole 31a of input shaft 31 within transmission casing 1 reaches to respective drive plates 42 via oil holes 453a of an inner wall section 453 positioned at the outer diameter side of input shaft 31.

It should, herein, be noted that, conventionally, it is a general thought that, if a larger quantity of lubricating oil is supplied to the friction plates (drive plates 42, driven plates 46), the coolability of the clutch (forward clutch 4) having these friction plates becomes better and it is a general practice that an increase of a quantity of lubricating oil supplied from input shaft 31 causes an increase of the coolability of clutch.

The present applicant has found out, from an analysis of the distribution of lubricating oil supplied from the inner diameter side within transmission casing 1, that the oil holes of lubricating oil (oil hole 31a of input shaft 31 and oil holes 453a of clutch drum 45) are disposed with the spatial intervals provided in the peripheral direction around rotation axis X so that a deviation occurs in the distributions of lubricating oil supplied from oil hole 31a of input shaft 31 and lubricating oil supplied from oil holes 453a of clutch drum 45 toward the outside in the radial direction.

It should, herein, be noted that the distribution of lubricating oil at the outside in the radial direction of oil holes 453a of clutch drum 45 will be exemplified.

As shown in (a) of FIG. 2, oil holes 453a are disposed on inner wall section 453 of clutch drum 45 rotated in a counterclockwise direction CW in (a) of FIG. 2 with the spatial intervals provided in the peripheral direction around rotation axis X. Therefore, regions A of (a) of FIG. 2, in each of which a density of lubricating oil OL supplied from a corresponding one of oil holes 453a is high, and regions B of (a) of FIG. 2, in each of which a density of air is higher than lubricating oil OL, are formed and positions of regions A and regions B are interlocked with the rotation of clutch drum 45 and are displaced in the peripheral direction around rotation axis X.

Therefore, regions A, in each of which the density of lubricating oil OL is high as described above, and regions B, in each of which the density of air is higher than lubricating oil OL, are also formed at an inner periphery of peripheral wall section 411 (the inner diameter side of drive plates 42) of clutch hub 41 to which lubricating oil OL finally reaches.

It should, herein, be noted that the present applicant has variously discussed and found out that (1) since a relative weight of lubricating oil is larger than air, when the centrifugal force having the same magnitude is acted upon air and lubricating oil, lubricating oil is easier to move toward the outside in the radial direction than air, (2) in the grooves (dot grooves 421, waffle grooves 431) through which lubricating oil moved according to the centrifugal force is caused to flow, as the width of each groove becomes narrower, a flow quantity of lubricating oil becomes smaller, an air content in the flowing lubricating oil becomes lower, and, as the width of each groove becomes wider, the flow quantity of lubricating oil becomes larger and the air content in the flowing lubricating oil becomes higher, (3) since a heat conductivity of air becomes lower than the heat conductivity of lubricating oil, as the air content in lubricating oil becomes lower, the coolability of the friction plates (drive plates 42, driven plates 46) when lubricating oil is caused to flow through the respective grooves becomes improved, and, as the air content in lubricating oil becomes higher, the coolability of the friction plates when lubricating oil is caused to flow through the respective grooves becomes lowered. In addition, the present applicant has found out, on a basis of these analyses, such a tendency that the coolabiliity of the friction plates is dependent upon the flow quantity of lubricating oil, in a case where the widths of respective grooves are narrow, and is dependent upon the air content in lubricating oil caused to flow through respective grooves, in a case where the widths of respective grooves are wide.

Thus, in this embodiment, on a basis of these found out tendencies, an upper limit and a lower limit of each width of grooves (dot grooves 421, waffle grooves 431) are set and an improvement in the coolability of the friction plates (the drive plates and the driven plates) is achieved.

Hereinafter, the setting of the upper limit and the lower limit of each width of the grooves (dot grooves 421, waffle grooves 431) will be explained.

Figure 3:
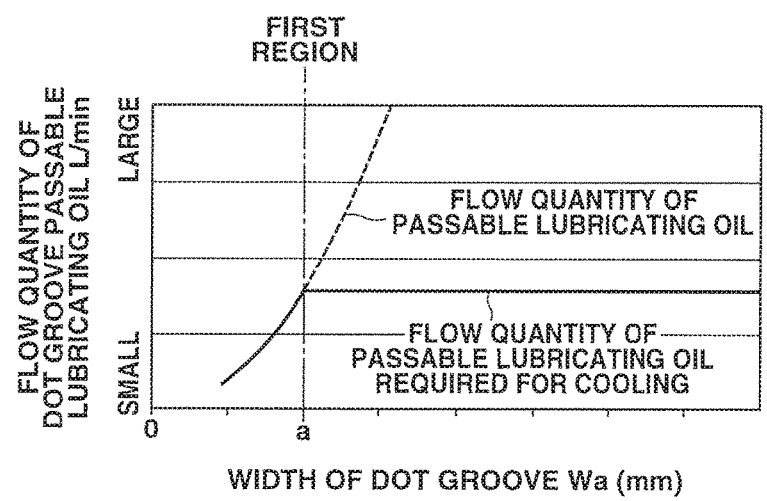
Figure 3:
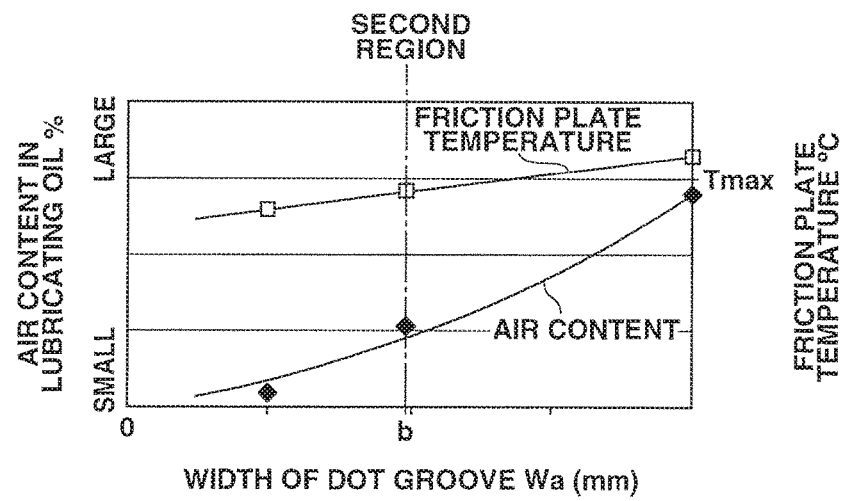

(a) of FIG. 3 shows a graph for explaining a relationship between width Wa of each of dot grooves 421 and a flow quantity of lubricating oil OL flowing through each of dot grooves 421 and (b) of FIG. 3 shows a graph for explaining a relationship among width Wa of each of dot grooves 421, the air content in lubricating oil OL flowing through each of dot grooves 421, and a temperature of the friction plates (drive plate 42, driven plate 46).

Figure 4:
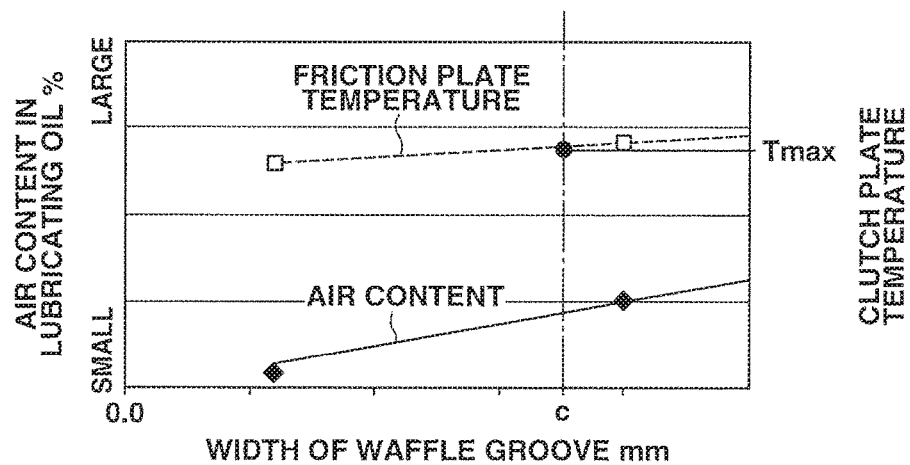
FIG. 4 is a graph for explaining a relationship among the width of a waffle groove, the air content in lubricating oil, and a temperature of the friction plate.

FIG. 4 shows a graph for explaining a relationship among width Wb of each of waffle grooves 431, the air content in lubricating oil OL flowing through each of waffle grooves 431, and the temperature of the friction plates (drive plate 42, driven plate 46).

Figure 5:
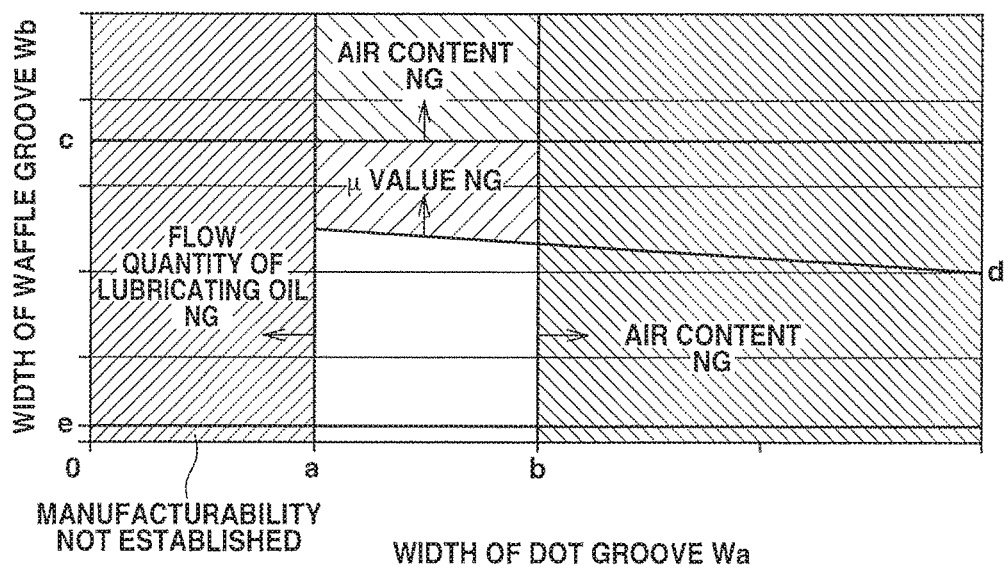
FIG. 5 is a graph for explaining upper limits and lower limits of the width of the dot groove and of the width of the waffle groove.

FIG. 5 shows a graph for explaining the upper limit and the lower limit of each of dot grooves 421 and the upper limit and the lower limit of each of waffle grooves 431.

[Dot Groove]

As shown in (a) of FIG. 3, when width Wa of each of dot grooves 421 is widened, the flow quantity of lubricating oil OL passable through each of dot grooves 421 becomes increased (in (a) of FIG. 3, the flow quantity of passable lubricating oil).

However, as shown in (b) of FIG. 3, when width Wa of each of dot grooves 421 becomes wider, air becomes easier to be flowed into each of dot grooves 421 and the air content in lubricating oil OL passing through each of dot grooves 421 becomes increased (the air content in (b) of FIG. 3).

It should, herein, be noted that, since a thermal conductivity of air is lower than the thermal conductivity of lubricating oil OL, as the air content in lubricating oil OL becomes lower, the coolability of friction plates (drive plate 42, driven plate 46) when lubricating oil OL passes through each of dot grooves 421 becomes improved. As the air content in lubricating oil OL becomes higher, the coolability of the friction plates when lubricating oil OL passes through each of dot grooves 421 is reduced.

In this embodiment, the air content at which the friction plates (drive plates 42, driven plates 46) can assuredly be cooled to a temperature equal to or below a preset upper limit temperature Tmax is derived through an experiment or so forth and a width b of each dot groove of a case where the air content becomes the derived air content is determined as the upper limit of width Wa of each of the dot grooves (refer to (b) of FIG. 3 and refer to FIG. 5).

In addition, when a width Wa of each of dot grooves 421 becomes narrower, the air content in lubricating oil OL becomes lowered. This is because (a) as width Wa of each of dot grooves 421 becomes narrower, air and lubricating oil OL become difficult to be caused to flow into each of dot grooves 421 and (b), since a specific gravity of lubricating oil OL is larger than that of air, when the centrifugal force having the same magnitude is acted upon air and lubricating oil OL, lubricating oil OL is easier to be moved than air so that lubricating oil OL is caused to flow into each of dot grooves 421 on a priority base.

Therefore, when the lower limit of width Wa of each of dot grooves 421 is determined, attention is paid to the fact that, in a case where the width of each of the grooves is narrow, an influence of the air content in lubricating oil on the coolability of the friction plates is low and the coolability of the friction plates is dependent upon the flow quantity of lubricating oil. In this embodiment, a minimum flow quantity of the flow quantity of lubricating oil OL at which the friction plates can assuredly be cooled to a temperature equal to or below upper limit temperature Tmax is derived through the experiment or so forth. Width a of each of dot grooves of a case where the flow quantity becomes the derived flow quantity is determined as the lower limit of width Wa of each of the dot grooves (refer to (a) of FIG. 3 and refer to FIG. 5).

That is, in this embodiment, attention is paid to a point that the coolability of the friction plates (drive plates 42, driven plates 46) is dependent upon the flow quantity of lubricating oil OL, in a case where the width of each of dot grooves 421 is narrow, and the coolability of the friction plates is dependent upon the air content in lubricating oil OL, in a case where the width of each of the dot grooves is wide. Thus, width Wa of each of dot grooves 421 is set between above described upper limit a and lower limit b (a<Wa<b: refer to FIG. 5).

[Waffle Groove]

As shown in FIG. 4, when width Wb of each of waffle grooves 431 is widened, the air content in lubricating oil OL flowing through each of waffle grooves 431 is raised (in FIG. 4, air content) and, in association with the rise of the air content, the temperature of the friction plates (drive plates 42, driven plates 46) is raised (clutch plate temperature in FIG. 4).

In addition, when width Wb of each of waffle grooves 431 is widened and a rate of waffle grooves 431 in each of facing members 43 becomes large, a contact area between each of facing members 43 and the corresponding one of driven plates 46 when the corresponding one of facing member 43 is brought in contact with the corresponding one of driven plates 46 under pressure becomes small. Therefore, there is a possibility that a design criterion μ value (a frictional resistance value) required to engage drive plates 42 with driven plates 46 in a state of being incapable of relative rotation cannot be secured.

It should, herein, be noted that the air content at which the friction plates can assuredly be cooled to a temperature equal to or below upper limit temperature Tmax and the design criterion μ value (the frictional resistance value) required to engage each of drive plates 42 with the corresponding one of driven plates 46 in the state of being incapable of relative rotation were derived through the experiments or so forth, respectively, a width c of each of waffle grooves 431 of a case where the air content becomes the derived air content and a width d of each of waffle grooves 431 of a case where the rate of waffle grooves 431 in the corresponding one of facing members 43 becomes below the rate of the upper limit at which the derived μ value can be assured were compared with each other.

Consequently, since width d of each of waffle grooves 431 determined according to the air content becomes smaller than width c of each of waffle grooves 431 determined according to μ value (refer to FIG. 5), in this embodiment, width d of each of waffle grooves 431 determined according to μ value is the upper limit value of width Wb of each of waffle grooves 431.

It should, herein, be noted that the area of each of facing members 43 in drive plates 42 is a factor which affects μ value required for the engagement. Therefore, when width Wa of each of dot grooves 421 in drive plates 42 becomes large, a whole area of each of facing members 43 becomes low. Hence, as this provisional upper limit width d becomes narrower, as width Wa of each of dot grooves 421 becomes wider (refer to a sign d in FIG. 5).

Furthermore, the lower limit of the width of each of waffle grooves 431 establishes a geometric shape manufacturability of each of waffle grooves 431 and is set to a minimum width e at which the passage of lubricating oil OL becomes possible (refer to FIG. 5).

As described before, in a region in which width Wa of each of dot grooves 421 is narrow, the coolability of the friction plates (drive plates 42, driven plates 46) is dependent upon the flow quantity of lubricating oil OL and, in a case where width Wa of each of dot grooves 421 is wide, the coolability of the friction plates is dependent upon the air content in lubricating oil OL flowing through each of dot grooves 421.

Therefore, as shown in FIG. 5, in this embodiment, width Wa of each of dot grooves 421 is set between upper limit value b determined on a basis of the air content in lubricating oil OL and lower limit value a determined on a basis of the flow quantity of lubricating oil OL.

Thus, a cooling failure due to a shortage of the flow quantity of lubricating oil OL (a case where width Wa is below lower limit a) and the cooling failure due to a shortage of a cooling capacity caused by high air content in lubricating oil (a case where width Wa is larger (wider) than upper limit value b) can suitably be prevented.

Furthermore, in this embodiment, upper limit width d of width Wb of each of waffle grooves 431 is set so that the rate of waffle grooves 431 in each of facing members 43 becomes a rate at which design criterion μ value required to engage drive plates 42 with driven plates 46 is securable. Hence, while cooling each of facing members 43, the generation of an engagement failure of the clutch (forwarding clutch 4) can suitably be prevented. It should be noted that, since width Wa of each of dot grooves 421 has a larger influence on the cooling of the clutch, in this embodiment, the lower limit of width Wb of each of waffle grooves 431 is set to a minimum width e at which the geometric shape manufacturability of each of waffle grooves 431 is established and the passage of lubricating oil OL becomes possible.

Since width Wa of each of dot grooves 421 and width Wb of each of waffle grooves 431 are set in such a range as described above, the clutch (forwarding clutch 4) can suitably be lubricated (cooled) without generation of the engagement failure of the clutch (forwarding clutch 4).

As described above, in this embodiment, (1) the cooling structure in forward clutch 4 (clutch) is configured in which, when drive plates 42 (inner diameter side friction plate) and driven plates 46 (outer diameter side friction plate), each of the drive and driven plates being relatively rotatably disposed around common rotation axis X, are pressed in rotation axis X direction by means of piston 44, facing members 43 disposed on respective drive plates 42 are brought in contact with respectively corresponding driven plates 46 under pressure and the relative rotations between drive plates 42 and driven plates 46 are regulated in accordance with a pressing force, wherein, on base section 420 of each of drive plates 42 forming the ring shape as viewed from the axial direction of rotation axis X, facing members 43 are disposed with predetermined spatial intervals provided in the peripheral direction around rotation axis X and dot grooves 421, through each of dot grooves lubricating oil OL moved from the inner diameter side to the outer diameter side according to the centrifugal force is caused to flow, are formed with equal widths, wherein the lower limit of width Wa of each of dot grooves 421 is set on a basis of the flow quantity of lubricating oil OL passing through a corresponding one of dot grooves 421 and the upper limit of width Wa is set on a basis of the air content in lubricating oil passing through each of dot grooves 421, wherein the lower limit of width Wa of each of dot grooves 421 is set to width a (first threshold width) at which the flow quantity of lubricating oil OL passing through each of dot grooves 421 becomes a minimum flow quantity at which drive plates 42 and driven plates 46 at which drive plates 42 and driven plates 46 are coolable to a temperature equal to or below upper limit temperature Tmax (predetermined temperature), and wherein the upper limit of width Wa of each of dot grooves 421 is set to width b (second threshold width) at which the air content in lubricating oil OL passing through each of dot grooves 421 becomes the maximum content at which lubricating oil OL having the corresponding air content can cool drive plates 42 and driven plates 46 to a temperature equal to or below upper limit temperature Tmax (predetermined temperature).

In each of dot grooves 421 through which lubricating oil OL is moved and passed according to the centrifugal force, as width Wa of each of dot grooves 421 becomes narrower, the flow quantity of lubricating oil OL becomes smaller and the air content in lubricating oil OL passing through each of dot grooves 421 becomes lower. In addition, as the width of each of dot grooves 421 becomes wider, the flow quantity of lubricating oil OL becomes larger and the air content in lubricating oil OL passing through each of dot grooves 421 becomes higher.

It should, herein, be noted that, since the thermal conductivity of air is lower than that of lubricating oil OL, as the air content in lubricating oil OL becomes lower, the coolability when lubricating oil OL is passed through each of dot grooves 421 becomes improved and, as the air content in lubricating oil OL becomes higher, the coolablity when lubricating oil passes each of dot grooves 421 becomes reduced.

Therefore, in a case where width Wa of each of dot grooves 421 is narrow, the coolablity is dependent upon the flow quantity of lubricating oil OL and, in a case where width Wa of each of dot grooves 421 is wide, the coolablity is dependent upon the air content in lubricating oil OL passing through each of dot grooves 421.

Hence, the cooling structure is configured as described above. The lower limit which regulates the narrower width of each of dot grooves 421 is set on a basis of the flow quantity of lubricating oil OL and the upper limit which regulates the wider width of each of dot grooves 421 is set on a basis of the air content in lubricating oil OL passing through each of the dot grooves. At this time, the upper limit and the lower limit of width Wa of each of dot grooves 421 are set on a basis of a factor giving a larger influence on the coolablity of the friction plates (drive plates 42, driven plates 46). Thus, the upper limit and the lower limit of width Wa of each of dot grooves 421 can be set which can suitably cool the friction plates (drive plates 42, driven plates 46). Hence, forward clutch 4 having drive plates 42 and driven plates 46 can more suitably be cooled.

Especially, in a case where number of rotations of clutch hub 41 is high, the centrifugal force acted upon lubricating oil OL which has reached to peripheral wall section 411 of clutch hub 41 becomes high. Thus, a flowing speed of lubricating oil passing through each of dot grooves 421 becomes fast.

It should, herein, be noted that, as the flowing speed of lubricating oil flowing through each of dot grooves 421 becomes faster, a contact time duration between lubricating oil OL and base section 420 of each of drive plates 42 becomes shorter. Hence, the quantity of heat which can be removed from base section 420 becomes lowered.

Figure 6:
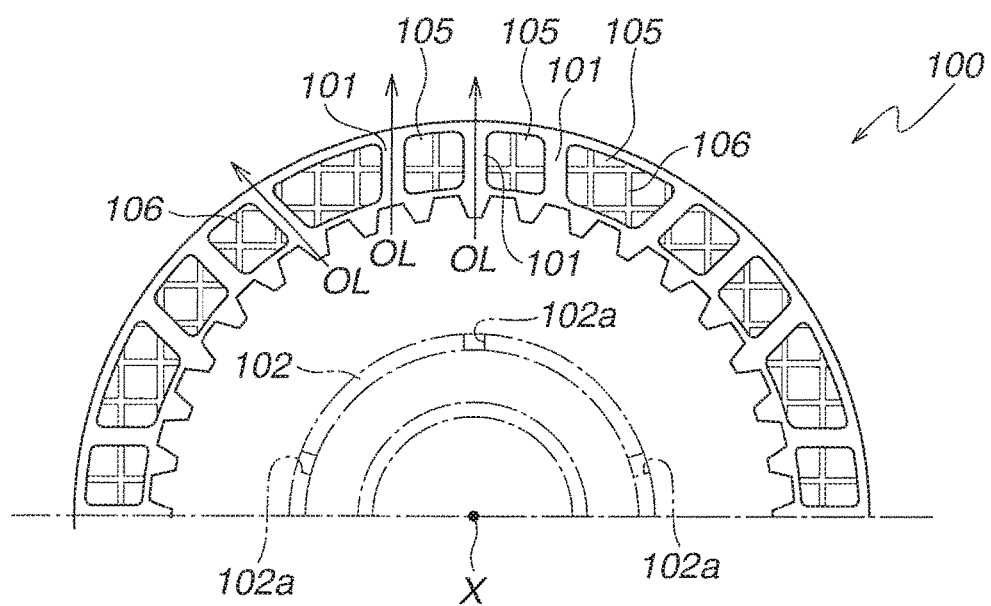
FIG. 6 is an explanatory view for explaining a conventional friction plate.

It should be noted that, as described above, in each of drive plates 42 of this embodiment, width Wa of each of dot grooves 421 is set to be narrower than the width of each of dot grooves 101 in conventional friction plate 100 (drive plate: refer to FIG. 6), with the air content in lubricating oil OL taken into consideration.

Therefore, the flowing speed of lubricating oil OL passing through each of dot groove 421 becomes lower than a case of conventional friction plate 100.

Thus, the contact time duration between lubricating oil OL and base section 420 of each of drive plates 42 becomes long. Then, a heat quantity that lubricating oil OL can remove from drive plates 42 becomes increased by a quantity corresponding the long contact time duration. Therefore, the coolability of forward clutch 4 is further improved.

Furthermore, since width Wa of each of dot grooves 421 is narrower than the width of each of dot grooves 101 of conventional friction plate 100 (refer to FIG. 6), the air content in lubricating oil OL passing through each of dot grooves 421 becomes low.

Since lubricating oil OL having the low air content can remove more heat from drive plate 42 than lubricating oil having the high air content, the friction plates (drive plates 42, driven plates 46) are more assuredly cooled and the coolability of forward clutch 4 can be improved.

Hence, even in a case where a time duration during which forward clutch 4 is in a slip state is longer than the case of the conventional automatic transmission, forward clutch 4 can suitably be cooled.

In addition, since the coolability of forward clutch 4 is more improved than conventional friction plate 100, even if the quantity of lubricating oil OL supplied from the inner diameter side (input shaft 31 side) is suppressed, the coolability equal to the conventional forward clutch can be secured. Therefore, it becomes possible to reduce the load on the oil pump supplying lubricating oil OL while suppressing the quantity of lubricating oil OL supplied from the inner diameter side.

(2) Waffle grooves 431 (recessed groove), each of the waffle grooves being recessed in a concave shape, are disposed on pressure-contact surfaces 430 of facing members 43 against a corresponding one of driven plates 46. The rate of area of each of waffle grooves 431 in the area of each of facing members 43 viewed from the rotation axis X direction is set to the rate at which μ value (frictional resistance value) required to engage each of drive plate 42 with the corresponding one of driven plates 46 in the state of being incapable of relative rotation between each of drive plates 42 and the corresponding one of driven plates 46 can be secured when the corresponding one of each of facing members 43 is brought in contact with the corresponding one of each of driven plates 46 under pressure.

When the rate of waffle grooves 431 in each of facing members 43 is increased, the contact area between the corresponding one of each of facing members 43 and the corresponding one of driven plates 46 becomes decreased when each of facing members 43 is brought in contact with the corresponding one of driven plates 46 under pressure. Hence, there is a possibility that the increased rate of waffle grooves described above cannot secure the μ value required to engage each of drive plates 42 and the corresponding one of driven plates 46 in the state of being incapable of engaging each of drive plates 42 with the corresponding one of driven plates 46.

In this case, although drive plates 42 and driven plates 46 can be cooled, there is a possibility that drive plates 42 and driven plates 46 cannot be engaged in the state of being incapable of relative rotation, drive plates 42 and driven plates 46 are in the slip state, and a durability of each of drive plates 42 and driven plates 46 becomes lowered. However, this embodiment is structured in the way described above and the μ value required to engage each of drive plates 42 with the corresponding one of driven plates 46 in the state of being incapable of relative rotation is secured. Thus, while the engagement failure between drive plates 42 and driven plates 46 is prevented, drive plates 42 and driven plates 46 can suitably be cooled.

(3) The upper limit of width Wb of each of waffle grooves 431 is set on a basis of width c (third threshold value) at which the flow quantity of lubricating oil OL passing through each of waffle grooves 431 becomes the minimum flow quantity at which drive plates 42 and driven plates 46 can be cooled to a temperature equal to or below upper limit temperature Tmax (predetermined temperature) and width d (fourth threshold width) at which the rate of area of waffle grooves 431 in the area of each of facing members 43 becomes the rate at which the μ value (frictional resistance value) required to engage each of drive plates 42 with the corresponding one of driven plates 46 in the state of being incapable of relative rotation can be secured when the corresponding one of each of facing members 43 is brought in contact with each of driven plates 46 under pressure and the lower limit of width Wb of each of waffle grooves 431 is set to the minimum width at which the geometric shape manufacturability of each of waffle grooves 431 is established and at which the flow of lubricating oil OL through each of waffle grooves 431 becomes possible.

In the structure described above, while the engagement of each of drive plates 42 and the corresponding one of driven plates 46 in the state of being incapable of relative rotation is secured, lubricating oil OL having the low air content is supplied to each of waffle grooves 431 so that facing members 43 can more uniformly be cooled than the conventional facing members. It should, herein, be noted that, since the area of facing members 43 on base section 420 of each of drive plates 42 is wide, facing members 43 can become more uniformly be cooled. Thus, an entire of each of drive plates 42 can uniformly and suitably be cooled. Hence, the friction plates (drive plates 42, driven plates 46) can more assuredly be cooled and the coolability of forward clutch 4 can further be improved.

(4) Upper limit temperature Tmax (predetermined temperature) is a temperature set on a basis of a heat resistance allowance temperature of each of drive plates 42 and driven plates 46 and is a temperature lower than the heat resistance allowance temperature.

According to the structure described above, a generation of heat due to the slippage between each of drive plates 42 and the corresponding one of driven plates 46 can be suppressed to a lower temperature than the heat resistance allowance temperature. Hence, the reduction in the durability of forward clutch 4 having drive plates 42 and driven plates 46 can suitably be suppressed. In addition, since a carbonization of each of facing members 43 adhered to the corresponding one of drive plates 42 can suitably be prevented, a life of forward clutch 4 can suitably be prevented from being equal to or below a design life.

It should, herein, be noted that, in the above-described embodiment, the case where facing members 43 are disposed on the corresponding one of drive plates 42 has been exemplified. However, facing members 43 may be disposed on an opposing surface of each of driven plates 46 against the corresponding one of drive plates 42 may be disposed. Even in the latter case, the same actions and effects as those in the above-described embodiment can be achieved.

Furthermore, the above-described embodiment exemplifies the case where the cooling structure in the clutch according to the present invention is applied to forward clutch 4 of forward-or-backward travel switching mechanism 3 equipped in the continuously variable transmission. However, the cooling structure in the clutch according to the present invention may be applied to each of the frictional engagement elements (clutch) in an automatic transmission in which a plurality of frictional engagement elements are disposed on a transmission route of the rotation driving force inputted from a drive source and a desired gearshift stage is achieved by switching a combination of engagement/release of the friction plates in each of the frictional engagement elements.

The invention claimed is:
1. A clutch, comprising:
inner diameter side friction plates each having a spline-fitted inner diameter side surface and outer diameter side friction plates each having a spline-fitted outer diameter side surface, the inner diameter side friction plates and the outer diameter side friction plates being relatively rotatably disposed around a common rotation axis; and
peripheral directionally adjoining facing members, each peripheral directionally adjoining facing member being disposed on a side surface of one of the inner diameter side friction plates and the outer diameter side friction plates, and structured such that when the inner diameter side friction plates and the outer diameter side friction plates are pressed in a rotation axis direction by a piston, the peripheral directionally adjoining facing members are brought in contact with a side surface of the other of the inner diameter side friction plates and the outer diameter side friction plates under pressure, and a relative rotation between the inner diameter side friction plates and the outer diameter side friction plates is regulated in accordance with a pressing force, and
oil holes supplying lubricating oil between peripheral directionally adjoined facing members that are disposed at spatial intervals in a peripheral direction around the rotation axis, the peripheral directionally adjoining facing members on the side surface of the one of the inner diameter side friction plates and the outer diameter side friction plates are each disposed at a predetermined interval of distance in the peripheral direction around the rotation axis,
wherein a groove through which lubricating oil which is moved from an inner diameter side to an outer diameter side according to a centrifugal force is formed between mutually adjoined facing members in the peripheral direction,
wherein, as a width of each of a plurality of grooves viewed from a rotation axis direction is narrower, a flow quantity of lubricating oil passing through each of the grooves is smaller, and an air content in lubricating oil passing through each of the grooves is lower,
wherein a lower limit of the width of each of the grooves viewed from the rotation axis direction is set on a basis of the flow quantity of lubricating oil passing through each of the grooves and an upper limit of the width of each of the grooves is set on a basis of the air content in lubricating oil passing through each of the grooves,
wherein the lower limit is set to a first threshold width at which the flow quantity of lubricating oil passing through each of the grooves is a minimum flow quantity so as to cool the inner diameter side friction plates and the outer diameter side friction plates to a temperature equal to or lower than a predetermined temperature, and
wherein the upper limit is set to a second threshold width at which the air content in lubricating oil passing through each of the grooves is a maximum content so as to cool the inner diameter side friction plates and the outer diameter side friction plates to a temperature equal to or lower than the predetermined temperature.

2. The clutch as claimed in claim 1, wherein the grooves comprise a plurality of recessed grooves that are disposed on pressure-contact surfaces of the peripheral directionally adjoined facing members against the other of the inner diameter side friction plates and the outer diameter side friction plates and an extent of an area of the recessed grooves relative to an area of the peripheral directionally adjoined facing members is set such that a $\mu$ value required to engage the inner diameter side friction plates with the outer diameter side friction plates in a state of being incapable of the relative rotation is securable when each of the peripheral directionally adjoining facing members is brought in contact with the other of the inner diameter side friction plates and the outer diameter side friction plates under pressure.

3. The clutch as claimed in claim 2, wherein an upper limit of a width of the recessed grooves is set on a basis of
a third threshold width, at which the flow quantity of lubricating oil passing through each of the recessed grooves is a minimum flow quantity so as to cool the inner diameter side friction plates and the outer diameter side friction plates to a temperature equal to or lower than the predetermined temperature, and
a fourth threshold width, at which the extent of the area of the recessed grooves to the area of the peripheral directionally adjoined facing members is such that the $\mu$ value required to engage the inner diameter side friction plates with the outer diameter side friction plates in the state of being incapable of the relative rotation is securable when each of the facing members is brought in contact with the other of the inner diameter side friction plates and the outer diameter side friction plates under pressure.

4. The clutch as claimed in claim 3, wherein a lower limit of the width of each of the recessed grooves is set to a minimum width to achieve geometric shape manufacturability of the recessed grooves and to allow lubricating oil to flow through each of the recessed grooves.

5. The clutch as claimed in claim 1, wherein the predetermined temperature is set with reference to a heat resistance allowance temperature of the clutch and the predetermined temperature is lower than the heat resistance allowance temperature.

6. A method for manufacturing a clutch, the clutch comprising:
inner diameter side friction plates each having a spline-fitted inner diameter side surface and outer diameter side friction plates each having a spline-fitted outer diameter side surface, the inner diameter side friction plates and the outer diameter side friction plates being relatively rotatably disposed around a common rotation axis; and
peripheral directionally adjoining facing members, each peripheral directionally adjoining facing member being disposed on a side surface of one of the inner diameter side friction plates and the outer diameter side friction plates, and structured such that when the inner diameter side friction plates and the outer diameter side friction plates are pressed in a rotation axis direction by a piston, the peripheral directionally adjoining facing members are brought in contact with a side surface of the other of the inner diameter side friction plates and the outer diameter side friction plates under pressure, and a relative rotation between the inner diameter side friction plates and the outer diameter side friction plates is regulated in accordance with a pressing force, the method comprising:
disposing oil holes supplying lubricating oil between peripheral directionally adjoined facing members at spatial intervals in a peripheral direction around the rotation axis, wherein the peripheral directionally adjoining facing members on the side surface of the one of the inner diameter side friction plates and the outer diameter side friction plates are each disposed at a predetermined interval of distance in the peripheral direction around the rotation axis, and forming a groove through which lubricating oil which is moved from an inner diameter side to an outer diameter side according to a centrifugal force between mutually adjoined facing members in the peripheral direction, wherein, as a width of each of a plurality of grooves viewed from a rotation axis direction is narrower, a flow quantity of lubricating oil passing through each of the grooves is smaller, and an air content in lubricating oil passing through each of the grooves is lower, setting a lower limit of the width of each of the grooves viewed from the rotation axis direction on a basis of the flow quantity of lubricating oil passing through each of the grooves and setting an upper limit of the width of each of the grooves on a basis of the air content in lubricating oil passing through each of the grooves, wherein setting the lower limit comprises setting the lower limit to a first threshold width at which the flow quantity of lubricating oil passing through each of the grooves is a minimum flow quantity so as to cool the inner diameter side friction plates and the outer diameter side friction plates to a temperature equal to or lower than a predetermined temperature, and wherein setting the upper limit comprises setting the upper limit to a second threshold width at which the air content in lubricating oil passing through each of the grooves is a maximum content so as to cool the inner diameter side friction plates and the outer diameter side friction plates to a temperature equal to or lower than the predetermined temperature.

7. The method of manufacturing the clutch as claimed in claim 6, wherein the grooves comprise a plurality of recessed grooves that are disposed on pressure-contact surfaces of the peripheral directionally adjoined facing members against the other of the inner diameter side friction plates and the outer diameter side friction plates and an extent of an area of the recessed grooves relative to an area of the peripheral directionally adjoined facing members is set such that a μ value, which is required to engage the inner diameter side friction plates with the outer diameter side friction plates such that the inner diameter side friction plates and the outer diameter side friction plates do not rotate relatively to each other in a state of being incapable of the relative rotation, is obtainable when each of the peripheral directionally adjoining facing members is brought in contact with the other of the inner diameter side friction plates and the outer diameter side friction plates under pressure.

8. The method of manufacturing the-clutch as claimed in claim 7, further comprising:
setting an upper limit of a width of the recessed grooves on a basis of
a third threshold width, at which the flow quantity of lubricating oil passing through each of the recessed grooves is a minimum flow quantity so as to cool the inner diameter side friction plates and the outer diameter side friction plates to a temperature equal to or lower than the predetermined temperature, and
a fourth threshold width, at which the extent of the area of the recessed grooves to the area of the peripheral directionally adjoined facing members is such that μ value is obtainable when each of the facing members is brought in contact with the other of the inner diameter side friction plates and the outer diameter side friction plates under pressure.

9. The method of manufacturing the clutch as claimed in claim 8, further comprising setting a lower limit of the width of each of the recessed grooves to a minimum width to achieve geometric shape manufacturability of the recessed grooves and to allow lubricating oil to flow through each of the recessed grooves.

10. The method of manufacturing the clutch as claimed in claim 6, further comprising:
setting the predetermined temperature with reference to a heat resistance allowance temperature of the clutch,
wherein the predetermined temperature is lower than the heat resistance allowance temperature.

11. A method for setting a groove width in each of a plurality of facing members of a clutch, the clutch comprising:
inner diameter side friction plates each having a spline-fitted inner diameter side surface;
outer diameter side friction plates each having a spline-fitted outer diameter side surface, the inner diameter side friction plates and the outer diameter side friction plates being disposed around a common rotation axis so as to rotate relatively around the common axis, the method comprising:
providing the facing members on one of the inner diameter side friction plates and the outer diameter side friction plates, such that when the inner diameter side friction plates and the outer diameter side friction plates are pressed in a common rotation axis direction by a piston, the facing members are brought into contact with the other of the inner diameter side friction plates and the outer diameter side friction plates under pressure, and relative rotation between the inner diameter plates and the outer diameter plates is regulated in accordance with a pressing force,
wherein the facing members are peripheral directionally adjoined to each other, and oil holes supplying lubricating oil between the peripheral directionally adjoined facing members are disposed at predetermined spatial intervals of distance in a peripheral direction of the facing members around the rotation axis,
wherein the facing members in the one of the inner diameter side friction plates and the outer diameter side friction plates are mutually installed at spatial intervals with each other in the peripheral direction around the rotation axis, and grooves, through which lubricating oil passes from an inner diameter side of the clutch to an outer diameter side of the clutch due to centrifugal force, are formed between the peripheral directionally adjoining facing members,
wherein, as a width of each of the grooves viewed from a direction of the rotation axis is narrower, a flow quantity of the lubricating oil passing through each of the grooves is lower, and an air content by percentage in the lubricating oil passing through each of the grooves is lower,
wherein the method further comprises setting a lower limit of the width of each of the grooves viewed from the direction of the rotation axis on a basis of the flow quantity of the lubricating oil passing through each of the grooves, and setting an upper limit of the width of each of the grooves on a basis of the air content by percentage in the lubricating oil passing through each of the grooves,
wherein setting the lower limit comprises setting the lower limit to a first threshold value width at which the flow quantity of the lubricating oil passing through each of the grooves provides a minimum flow quantity so as to cool the inner diameter side friction plates and the outer diameter side friction plates to a predetermined temperature or lower, and wherein setting the upper limit comprises setting the upper limit to a second threshold value width at which the air content by percentage in the lubricating oil passing through each of the grooves provides a maximum air content by percentage so as to cool the inner diameter side friction plates and the outer diameter side friction plates to a predetermined temperature or lower.

* * * * *